United States Patent
Maaseidvaag et al.

(10) Patent No.: US 9,965,721 B2
(45) Date of Patent: May 8, 2018

(54) COMPUTER-IMPLEMENTED SYSTEM AND METHOD OF PERFORMING A DESIGN OF EXPERIMENT, GENERATING A PRODUCT THEREOF, GENERATING DESIGNED EXPERIMENT OPTIONS, AND A GRAPHICAL USER INTERFACE

(71) Applicant: MoreSteam Development LLC, Powell, OH (US)

(72) Inventors: Lars Maaseidvaag, Venice, FL (US); Smita Kulkarni Skrivanek, Indianapolis, IN (US); Alan Gao, Columbus, OH (US)

(73) Assignee: Moresteam Development, LLC, Powell, OH (US)

( * ) Notice: Subject to any disclaimer, the term of this patent is extended or adjusted under 35 U.S.C. 154(b) by 715 days.

(21) Appl. No.: 14/488,060

(22) Filed: Sep. 16, 2014

(65) Prior Publication Data

US 2015/0081596 A1   Mar. 19, 2015

Related U.S. Application Data

(60) Provisional application No. 61/878,580, filed on Sep. 16, 2013.

(51) Int. Cl.
 *G06N 5/04*   (2006.01)
(52) U.S. Cl.
 CPC .................................... *G06N 5/04* (2013.01)
(58) Field of Classification Search
 None
 See application file for complete search history.

(56) References Cited

U.S. PATENT DOCUMENTS

| | | |
|---|---|---|
| 5,953,005 A | 9/1999 | Liu |
| 6,236,955 B1 | 5/2001 | Summers |
| 6,325,632 B1 | 12/2001 | Chao et al. |
| 6,735,596 B2 | 5/2004 | Corynen |

(Continued)

OTHER PUBLICATIONS

Faul et al. G*Power 3: A flexible statistical power analysis program for the social, behavioral, and biomedical sciences. Behavior Research Methods, May 2007, vol. 39, Issue 2, pp. 175-191.*

(Continued)

*Primary Examiner* — Stanley K. Hill
(74) *Attorney, Agent, or Firm* — Amatong McCoy LLC; Alberto Q. Amatong, Jr.

(57) ABSTRACT

Disclosed is a computer-implemented method of generating a plurality of selectable design experiments in a design of experiments (DOE) process for analyzing at least one data set from a process to determine a relationship of a plurality of process factors of interest to a process output of interest. The method entails receiving as user input into a computing apparatus, a base number of trials and a number of center point trials. From the computing apparatus, a graphical user interface is generated on a display connected with the computing apparatus. This includes presenting a display containing a plurality of experiment each defined, at least partially, by a combination of number of replicates (replicates count) and effect size. The display further includes a predicted power value for each combination of replicates count and effect size.

31 Claims, 14 Drawing Sheets

(56) References Cited

U.S. PATENT DOCUMENTS

| | | |
|---|---|---|
| 7,062,458 B2 | 6/2006 | Maggioncalda et al. |
| 7,096,176 B1 | 8/2006 | Hess |
| 7,308,653 B2 | 12/2007 | Lin-Hendel |
| 7,689,394 B2 | 3/2010 | Furem et al. |
| 7,770,100 B2 * | 8/2010 | Chamberlain ........ G06F 17/211 715/212 |
| 7,778,720 B2 | 8/2010 | Alse |
| 7,787,058 B1 | 8/2010 | Smereski et al. |
| 7,987,074 B2 | 7/2011 | Carazzone et al. |
| 8,306,797 B2 | 11/2012 | Furem et al. |
| 8,612,366 B2 | 12/2013 | Hathaway et al. |
| 2002/0076674 A1 | 6/2002 | Kaplan |
| 2002/0182570 A1 | 12/2002 | Croteau et al. |
| 2003/0145338 A1 | 7/2003 | Harrington |
| 2003/0167265 A1 | 9/2003 | Corynen |
| 2004/0013292 A1 | 1/2004 | Raunig |
| 2004/0115608 A1 | 6/2004 | Meyer |
| 2004/0158338 A1 | 8/2004 | Mammoser et al. |
| 2005/0004789 A1 | 1/2005 | Summers |
| 2005/0075915 A1 | 4/2005 | Clarkson |
| 2007/0038559 A1 | 2/2007 | Jung et al. |
| 2007/0061274 A1 | 3/2007 | Gipps et al. |
| 2007/0156382 A1 * | 7/2007 | Graham, II ............ G06Q 10/00 703/22 |
| 2008/0109750 A1 | 5/2008 | Lin-Hendel |
| 2008/0235076 A1 | 9/2008 | Cereghini et al. |
| 2008/0306337 A1 | 12/2008 | Livingston et al. |
| 2009/0012927 A1 * | 1/2009 | Brooks ................ G06Q 30/02 706/52 |
| 2009/0138415 A1 | 5/2009 | Lancaster |
| 2010/0122117 A1 | 5/2010 | Generazio |
| 2012/0075322 A1 | 3/2012 | Hathaway et al. |
| 2015/0094996 A1 * | 4/2015 | Barberis ............. G06F 17/5009 703/2 |

OTHER PUBLICATIONS

U.S. Office Action dated May 7, 2013 issued in U.S. Appl. No. 12/893,884, 15 pages.

U.S. Final Office Action dated Sep. 24, 2013 issued in U.S. Appl. No. 12/893,884, 13 pages.

U.S. Office Action dated Sep. 10, 2014 issued in U.S. Appl. No. 12/893,884, 14 pages.

* cited by examiner

| REPLICATES | EFFECT SIZE | POWER VALUES |
|---|---|---|
| 1 | .50 cm | 25% |
| 1 | .75 cm | 28% |
| 1 | 1.0 cm | 35% |
| 1 | 1.25 cm | 45% |
| 1 | 1.50 cm | 57% |
| 2 | .50 cm | 43% |
| 2 | .75 cm | 48% |
| 2 | 1.0 cm | 51% |
| 2 | 1.25 cm | 65% |
| 2 | 1.50 cm | 71% |
| 3 | .50 cm | 56% |
| 3 | .75 cm | 62% |
| 3 | 1.0 cm | 75% |
| 3 | 1.25 cm | 80% |
| 3 | 1.50 cm | 82% |
| 4 | .50 cm | 77% |
| 4 | .75 cm | 81% |
| 4 | 1.0 cm | 82% |
| 4 | 1.25 cm | 93% |
| 4 | 1.50 cm | 98% |
| 5 | .50 cm | 82% |
| 5 | .75 cm | 84% |
| 5 | 1.0 cm | 87% |
| 5 | 1.25 cm | 98% |
| 5 | 1.50 | 99% |

FIG. 6

COMPUTER-IMPLEMENTED SYSTEM AND METHOD OF PERFORMING A DESIGN OF EXPERIMENT, GENERATING A PRODUCT THEREOF, GENERATING DESIGNED EXPERIMENT OPTIONS, AND A GRAPHICAL USER INTERFACE

The present application claims the benefit of U.S. Provisional Application Ser. No. 61/878,580, filed on Sep. 16, 2013 (pending), which disclosure is hereby incorporated by reference for all purposes and made a part of the present disclosure.

BACKGROUND

The present disclosure relates generally to a Design of Experiments (DOE) process, and more particularly, a system and computer implemented method of performing and/or generating a DOE. The disclosure also relates to a system (or apparatus) and a graphical user interface relating to the method and process.

United States Patent Application Publications US 2012/0079379 (now issued as U.S. Pat. No. 8,612,366 on Dec. 17, 2013) and US 2012/0075322 are directed to systems and methods for designing experiments and presenting results of experiments, respectively. More particularly, the publications describe a method of automatically designing a plurality of experiments for analyzing at least one data set from a process to determine a relationship of a plurality of process factors of interest to a process output of interest. To illustrate certain concepts, the publications describe a computer-implemented DOE wizard for step-by-step guidance through the design of experiments. In one respect, the present disclosure provides improvements to the general systems and methods to which these prior publications are directed, and more specifically, to computer-implemented techniques and graphical user interfaces employed in such DOE wizard applications. Accordingly, the descriptions in these publications of a DOE process and the computer-implementation thereof may serve well as background to the present disclosure. Each of the two Patent Application Publications is hereby incorporated by reference in its entirety and made a part of the present disclosure for purposes of describing the state of the art of DOE processes.

A common failing of DOE designed experiments stems from experiments lacking sufficient "power" to achieve the target goals. Unfortunately, this failing is only detectable after trials are run and the results are analyzed. Prior to running the experiment, conventional DOE processes rely heavily on the experience and insight of the experimenter to assess the power adequacy of proposed experiments. After a deficiency is detected post-experiment, the problem is sometime addressed by incorporating additional trials, which may allow for the DOE process to continue while retaining the previous experimental results. This usually means, however, that the project incurs a time delay and additional cost for trial runs that were not originally contemplated. More often than not, however, the addition of trial runs late in the process cannot cure the deficiency, which results in the loss of the experimental trials and results.

There remains a need to improve DOE processes by providing experimenters further information and guidance on proposed experiments. Such improvements may be aimed at minimizing cost and inefficiency, and also at enhancing the DOE process for the experimenter.

SUMMARY

A computer-implemented method is disclosed for generating (or presenting) designed experiments on conducting a design of experiments (DOE), wherein the experiments are for analyzing a data set from a process to determine an effects relationship between a plurality of process factors and a process output. The method entails receiving as user input into a computing apparatus, a base number of trials and a number of center point trials. The method further includes generating a graphical user interface on a display connected with the computing apparatus, including presenting a plurality of designed experiment options. Each experiment option is defined, at least partially, by a combination of number of replicates (replicates count) and effect size, and a predicted power value for each combination of replicates count and effect size. More preferable, the cell in the Table or Matrix is a user—or controller—responsive (engageable) graphical object element of the user interface that, upon engagement institutes further processing. In exemplary embodiments, the engagement of a cell in this way effects selection of an experiment option which prompts generation of fresh user interface containing details on the selected experiment option.

In one embodiment, presenting a plurality of designed experiment options further includes generating a table identifying a power value, on the table, to each combination of replicates count and effect size. Preferably, the table contains a plurality of cells, each cell containing a power value and associated uniquely with a combination of replicates count and effect size. More preferably, a matrix is generated that is defined by replicates count and effect size and contains, as elements, predicted power values for each combination of replicates count and effect size.

In another aspect, a non-transitory computer-accessible storage medium is provided storing program instructions computer-executable to implement one or more graphical user interfaces for presentation of design of experiments options on a computer display. The experiments are for analyzing a data set from a process to determine an effects relationship between a plurality of process factors and a process output, wherein generation of a graphical user interface presenting designed experiment options is responsive to user select input of base number of trials, effect size, and number of center point trials. The graphical user interface presenting designed experiment options includes a first array of numerical values of replicates count in a designed experiment option and a second array of numerical values of effect size in a designed experiment option. The first array and second array are positioned in alignment such that each of the replicates counts in the first array uniquely align with one of the effect size values in the second array, and wherein a designed experiment power value is determined and presented in unique association with a combination of replicates count and the effect sizes aligned therewith. Preferably, the graphical user interface presenting designed experiment options further includes an array of cost of trial values, each of the cost values being associated with a combination of replicates count and effect size. More preferably, the power values are color coded by strength of power value. More preferably yet, the first array, the second array, and the power values are presented in a matrix table having a dimension equal to the number of replicate values by the number of effect size values, and containing, as elements, power values for each combination of replicates count and effect size. The power values may be contained in cells forming the matrix, wherein each cell is engageable by a user to select a designed experiment option identified to the combination of replicates count and effect size associated with said engaged cell.

In another aspect, a computer-implemented method is provided for conducting a design of experiments (DOE) for analyzing a data set from a process to determine an effects relationship between a plurality of process factors and a process output. The method entails entering into a computing apparatus, a base number of trials, a number of center point trials, and a target effect size, and prompting the computing apparatus to generate on a display connected with the computing apparatus, a graphical user interface. This includes presenting a display containing a plurality of designed experiment options each defined, at least partially, by a combination of replicates count and effect size. The user interface further presents a predicted power value for each combination of replicates count and effect size. Preferably, presenting designed experiment options includes generating a table displaying the power values, wherein each power value is identified uniquely a combination of replicates count and effect size, and more preferably, wherein the table contains a plurality of cells, each cell containing a power value identified to a combination of replicates count and effect size. The method may further include selecting an experiment option by prompting a cell with a power value, thereby causing display of a subsequent graphical user interface presenting information on the selected designed experiment option.

BRIEF DESCRIPTION OF THE DRAWINGS

FIG. 6 is an illustration of a graphical user interface display according to an alternate embodiment.

DETAILED DESCRIPTION

Before any embodiments are explained in detail, it is to be understood that the systems, apparatus, methods, and products according to the present disclosure are not limited in its application to the details in the examples provided in this Description. Specific examples are provided for illustration only. The arrangement of steps in the process or the components in the system may be varied in further embodiments. Moreover, specific graphical user interfaces are depicted and described herein to illustrate steps or stages in methods. It should be noted that, in further embodiments, such steps or stages may be carried out in a manner involving different graphical user interfaces and possibly a different sequence or series of graphical user interfaces.

The following definitions are applicable to the immediate discussion of Design of Experiments in this disclosure and are provided to lend clarity to descriptions.

"Power" is a measure of the ability of an experiment to detect a signal (the effect), given that the effect exists.

"Effects" refer to the relationships between inputs and outputs, which may be measured "Main Effects" refer to a measurable effect on an output as a direct result of change in the value of a process input.

"Interaction Effects" refer to a change in an output caused by a combination of changes in the value of two or more inputs to the process.

"Replicates" refer to the number of times an experiment is run.

"Run" refer to the conduct of an experiment.

"Factors" refer to process inputs.

"Levels" refer to values or measures of factors

As used herein, a Design of Experiments (DOE) is a statistical technique for generating or presenting a proposed experiment comprised of several trials or runs. The DOE process described in this disclosure may culminate in or produce a number of such proposed experiments. For a given process of interest, the goal of the experiment is to characterize and quantify the relationship between inputs to the process (referred to as "X") and the output of the process (referred to as "Y"). The process inputs are also referred to as factors. The relationships between the inputs or factors and the output Y are called "effects". The effects between the input X's and the output Y can take several forms. There are typically "main effects" which indicate that a change in the input value of a single X has a direct and measurable effect on the output Y. There are often also "interaction effects" where the combination of changes to two or more of the inputs X causes a corresponding change in the output Y. The DOE technique is designed to generate and present a combination of experimental runs or trial that will efficiently identify both main and interaction effects.

Figure 1:
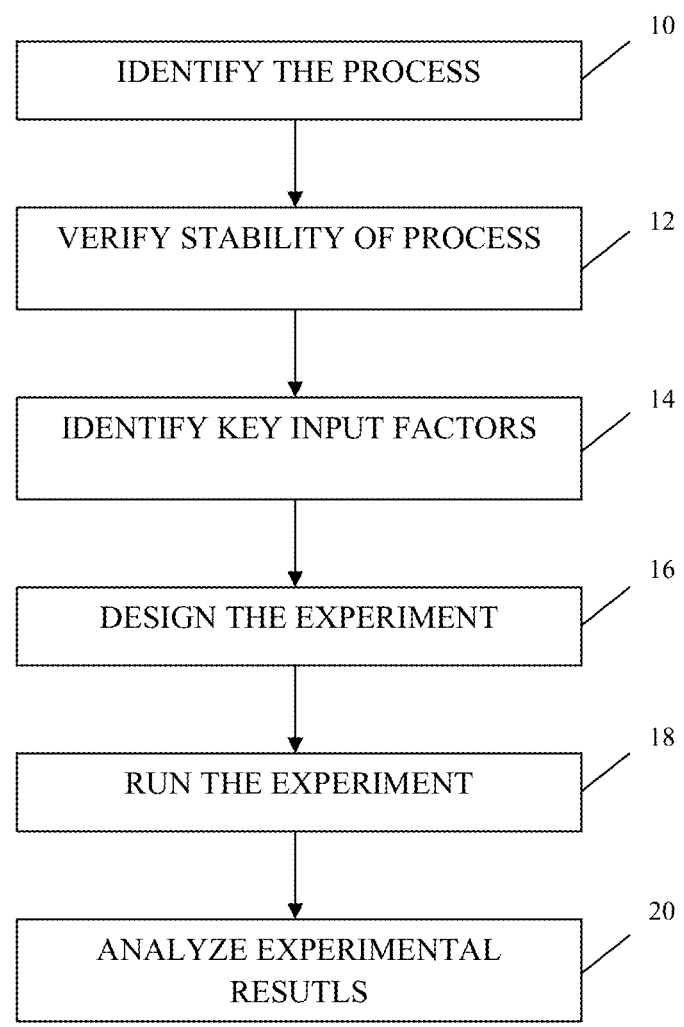
FIG. 1 is a simplified flow chart of a Design of Experiments process.

The improvements presented in this disclosure are well suited for application to or with an exemplary DOE process generally illustrated by the process flow chart of FIG. 1. In an initial step, the process to be studied is identified by the prospective experimenter (10). Examples of possible subjects of study include the effect of various marketing techniques, the effect of various inputs on baking muffins, or more simply, the measurement of the dimension of a room. Next, the experimenter verifies that the process to be studied is stable and in statistical control (12). Typically, this means that the process is confirmed to have a stable average (mean) value and a stable standard deviation or variance. The assumption of stability is a key input to the DOE process introduced in this disclosure.

With the subject process of study identified and confirmed, the experimenter identifies the key input factors (Xs) (14). A variety of generally known techniques may be employed to determine and/or identify factors X that are "suspected" to have a significant impact on the output Y. The experimenter may lean on historical information or personal experience in determining the key input factors. Generally, a goal of the experiment is to determine more precisely which of the suspected inputs X have a true impact on the output Y or meet a pre-determined impact threshold. Thus, the experimenter should aim to include all potential factors X, or be over-inclusive rather than being exact or under-inclusive. If a key factor is missed and not included in the experiment, the experiment may not achieve its goals.

The process then proceeds to the design stage, wherein an experiment is proposed or designed (16). The three main outputs of a proposed design are the following:

a. The number of experiments (runs) required by the experimental design, including center points and replicates;

b. The degree of confounding inherent in the design; and
c. The power of the design.

The power of the design refers to its capacity to detect the degree of change in the output Y. In other words, the power of the design is an indication of the change in the output Y that the experimenter can detect with the experiment implemented. In one aspect, the systems and methods disclosed herein quantifies and predicts for the prospective experimenter the power of proposed experiments.

The experimenter then implements the trials or runs of the experiment and collects the response (output Y) data (the Run step of the DOE process) (18). This leads to the subsequent step of the process in which the experimental results are analyzed (20). Through analysis, the experimenter may determine which of the main and interaction effects are significant. With the conventional DOE process, the experiment may learn only after running experiments that the power of the design are insufficient to detect the degree of change in the output Y desired or required. Unfortunately, when such a deficiency is found, there is relatively little chance that the experiment can be salvaged.

U.S. Patent Application Publication 2012/0079379A1 describes a computing system (see FIG. 1 in the Publication) and a wizard for guiding a user through the DOE process (see e.g., FIGS. 3-34 in the Publication). Reference is made to such a computing system and user interface screens of the design wizard as being of the type suitable for performing various steps or stages of the methods and processes of the present disclosure. A computing system of the type described in the Publication is substantially replicated in this disclosure.

Figure 2:
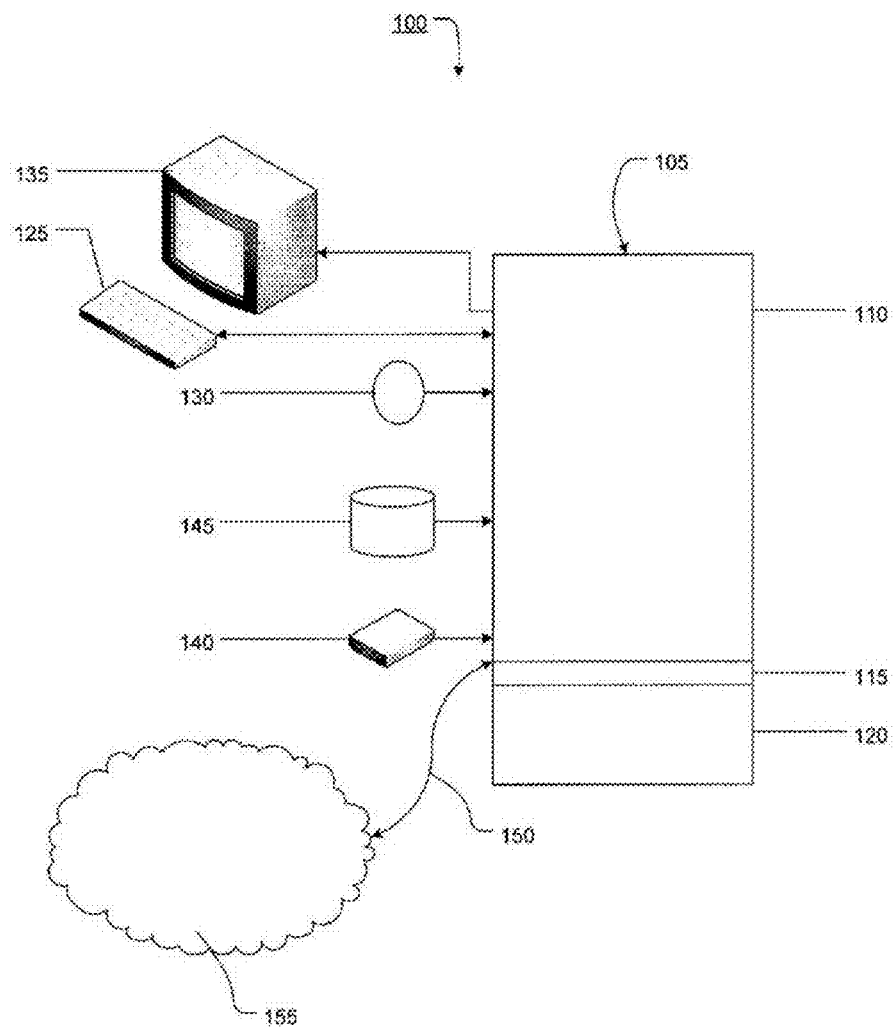
FIG. 2 is an exemplary system capable of performing one or more steps of the Design of Experiment process and generating and displaying a graphical user interface therefore.
Figure 3A:
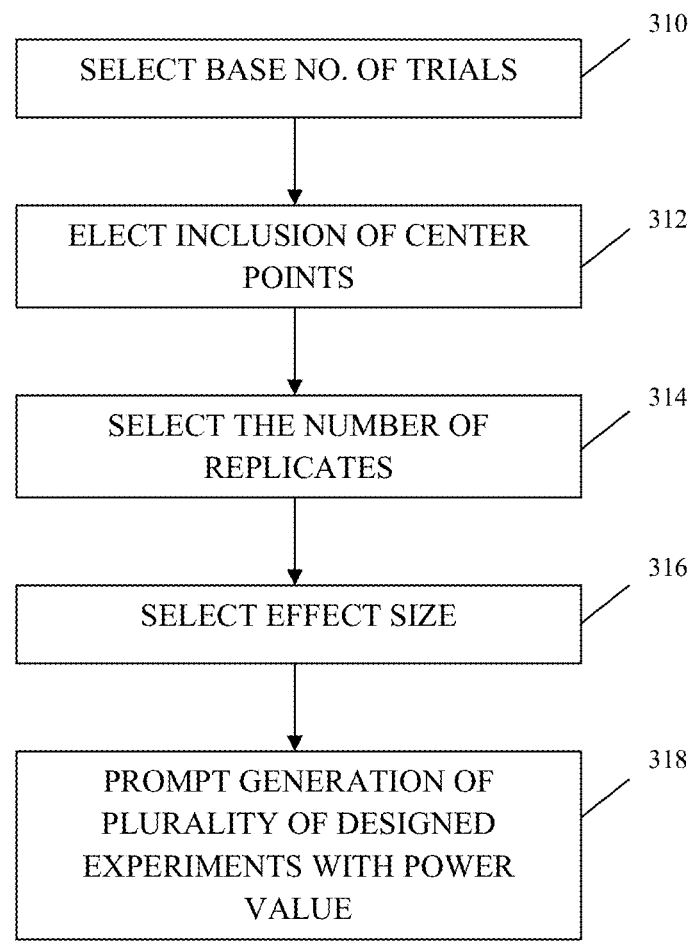
FIGS. 3A-3B are simplified flow charts of an exemplary Design of Experiment process, according to the present disclosure.
Figure 3B:
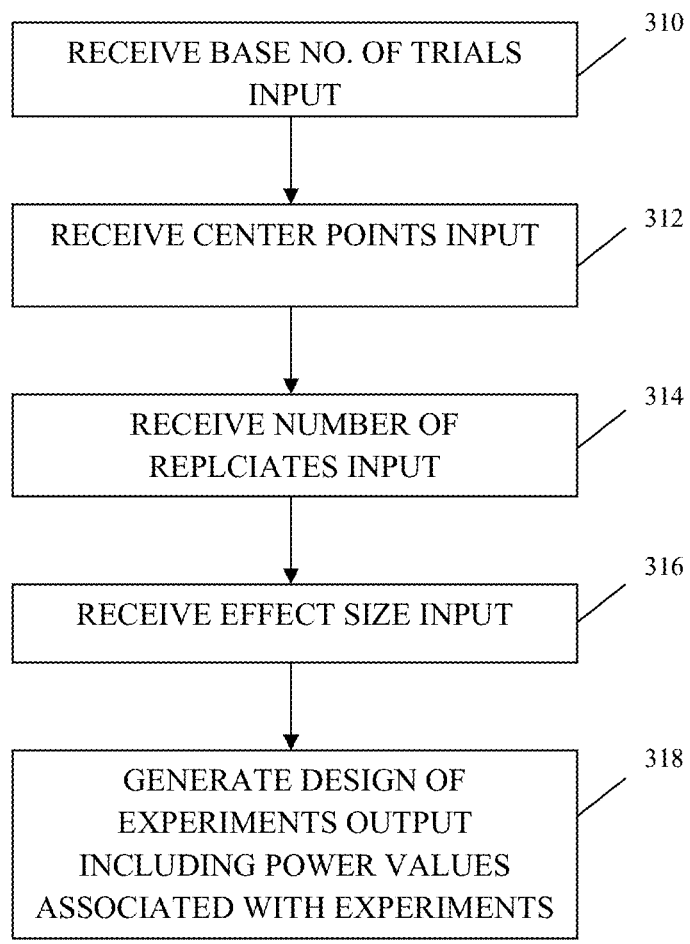

FIG. 2 illustrates a computing system for performing DOE processes, presenting DOE experiments and generating graphical user interfaces according to embodiments of the present disclosure. The system includes a general purpose computer or computing apparatus 100. The computer 100 provides a platform for operating a software program that guides a user through the design of experiments and then analyzes the results of the experiment. In the system identified, data and program files are input to the computer 100, which reads the files and executes the programs therein. Some of the elements of the computer 100 include a processor 1-5 having an input/output (IO) section 110, a central processing unit (CPU) 115, and a memory module 120. In one form, the software program for DOE is loaded into a nontransitory computer readable medium such as a memory 120 and/or a configured CD ROM (Not show) or other storage device (not shown). The software program includes instructions that are executed by the processor 105. The IO section 110 is connected to a keyboard 125 and an optional user input device or mouse 130. The keyboard 125 and mouse 130 enable the user to control the computer 100. IO section 110 is also connected to a monitor 135. In operation, computer 100 generates the user interfaces identified in FIGS. 4-6 and displays those user interfaces on the monitor 135. The computer also includes a CD ROM drive 140 and a data storage unit 145 connected to IO section 110. In some embodiments, the software program for DOE may reside on the storage unit 145 or in memory unit 120 rather than being accessed through the CD ROM drive using a CD ROM. Alternatively, CD ROM drive 140 may be replaced or supplemented by a floppy drive unit, a tape drive unit, a flash drive, or other data storage device. The computer 100 also includes a network interface 150 connected to IO section 110. The network interface 150 can be used to connect the computer 100 to a local area network (LAN), wide area network (QAN), internet based portal, or other network 155 (e.g., cloud storage, library, software calculation package (including "power" calculations)). Any suitable interface can surface, including both wired and wireless interfaces. Thus, the software may be accessed and run locally as from CD ROM drive 140, data storage device 145, or memory 120, or may be remotely accessed through network interface 150. In the network embodiment, the software may be stored remote from the computer 100 on a server or other appropriate hardware platform or storage device.

In one embodiment, the software is an add-in running in Microsoft Excel. A user loads the software onto the computer 100, and when the user starts up Excel a menu selection for the add-in appears on a menu bar. By clicking through the menu selection and any submenus, the user is provided with a DOE menu. In some embodiments, the DOE menu provides the user with four choices: a DOE planning worksheet, a design wizard, a run default analysis, and a run custom analysis. Clicking the DOE planning worksheet opens a new worksheet 200 (FIG. 2). The worksheet 200 includes a plurality of cells for defining experiments. The worksheet 200, while optional, assists a user in planning experiments by having eh user provide all the information that will be needed to design the experiments. In addition, spaces are provided for information that is useful for implementing the experiments (e.g., the process owner's name, the objective of the experiments, etc.).

Figure 4A:
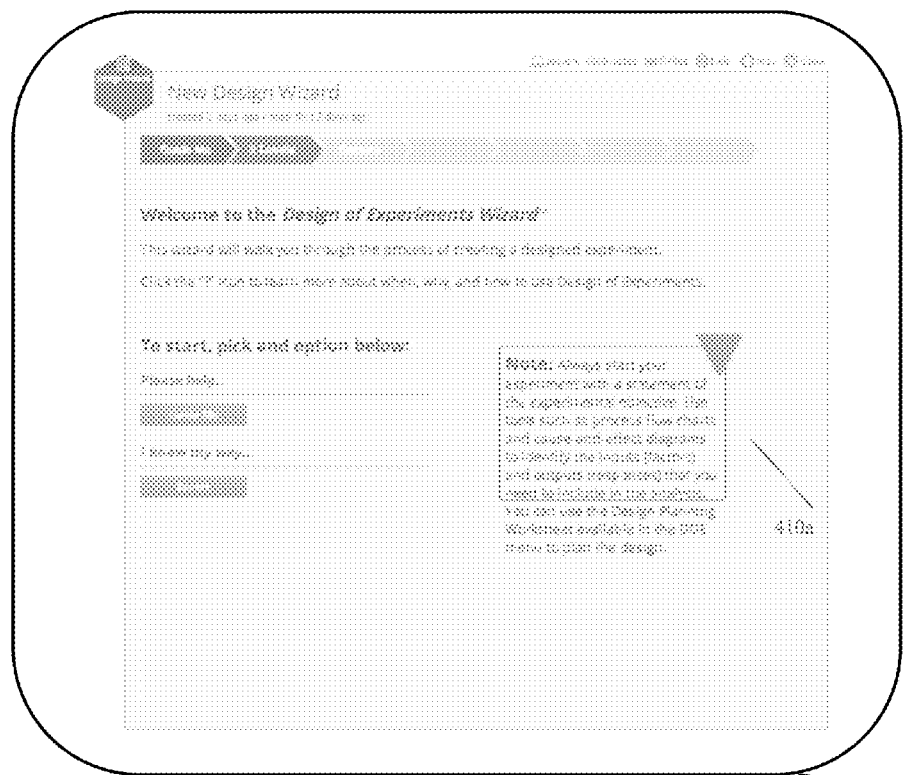
FIGS. 4A-4H are illustrations of exemplary graphical user interface displays, according to the present disclosure, suitable for use with a DOE system and/or process, also according to the present disclosure.
Figure 4B:
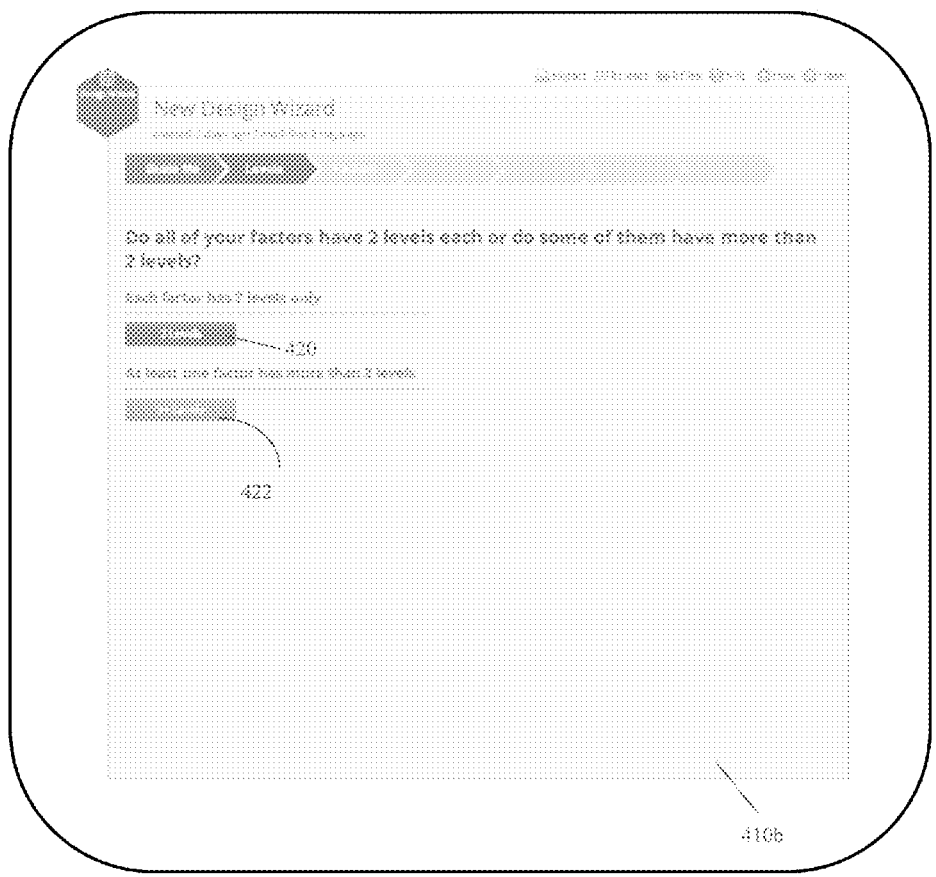
Figure 4C:
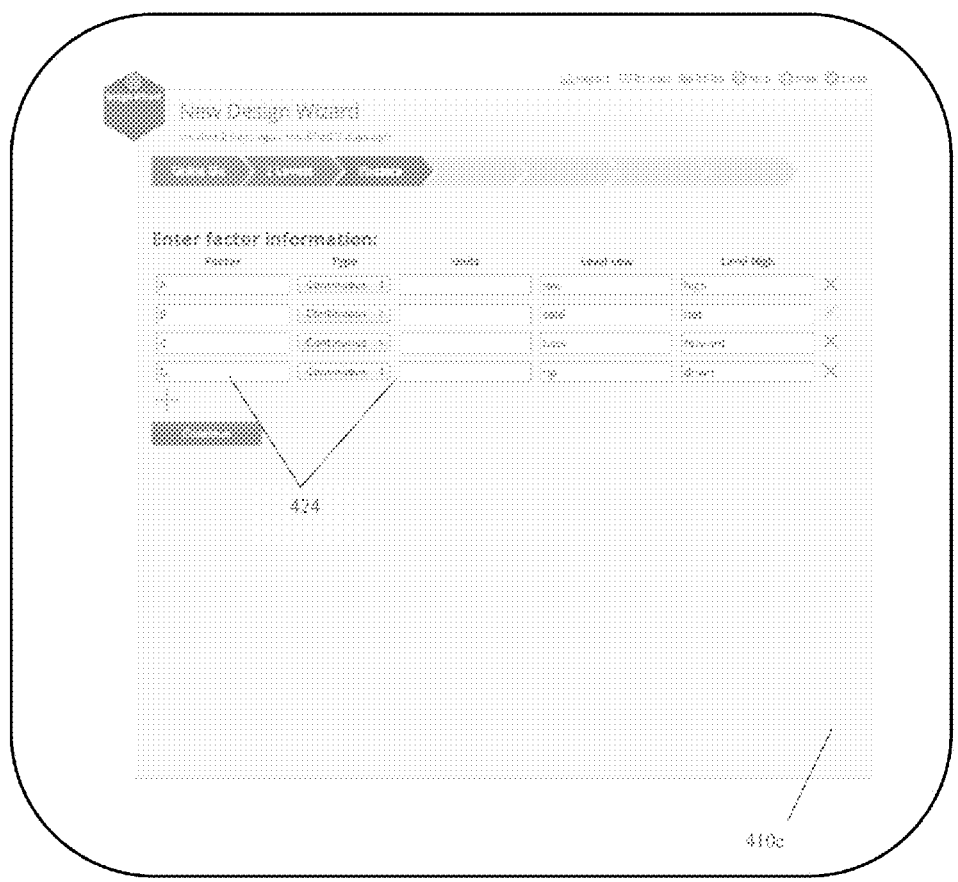
Figure 4D:
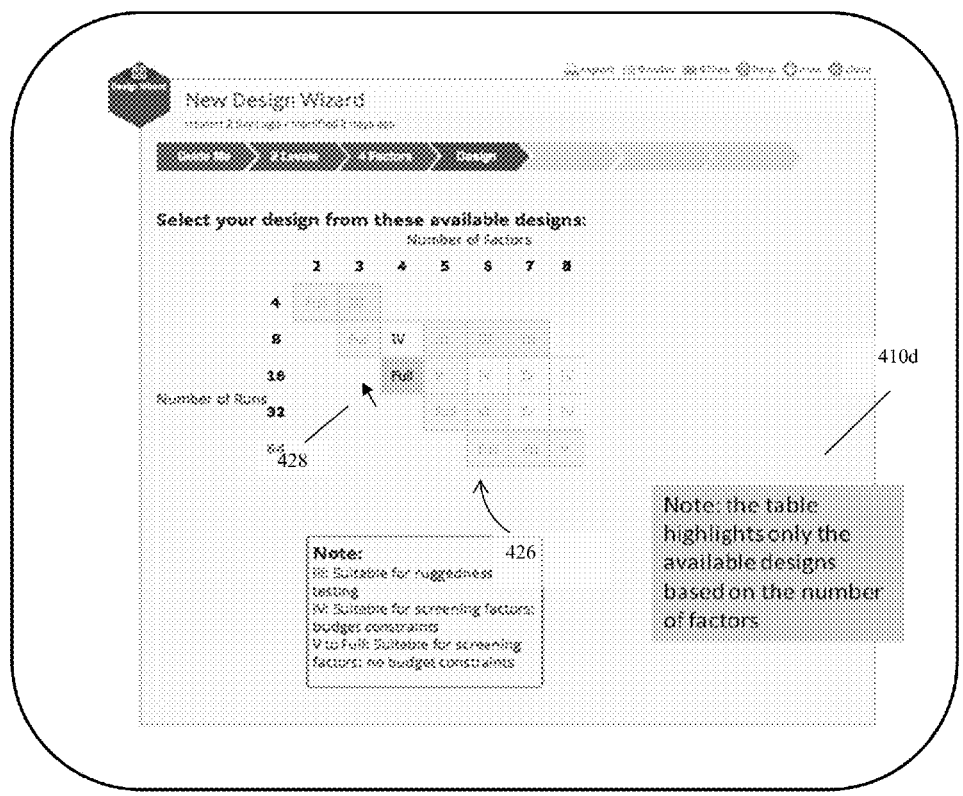
Figure 4E:
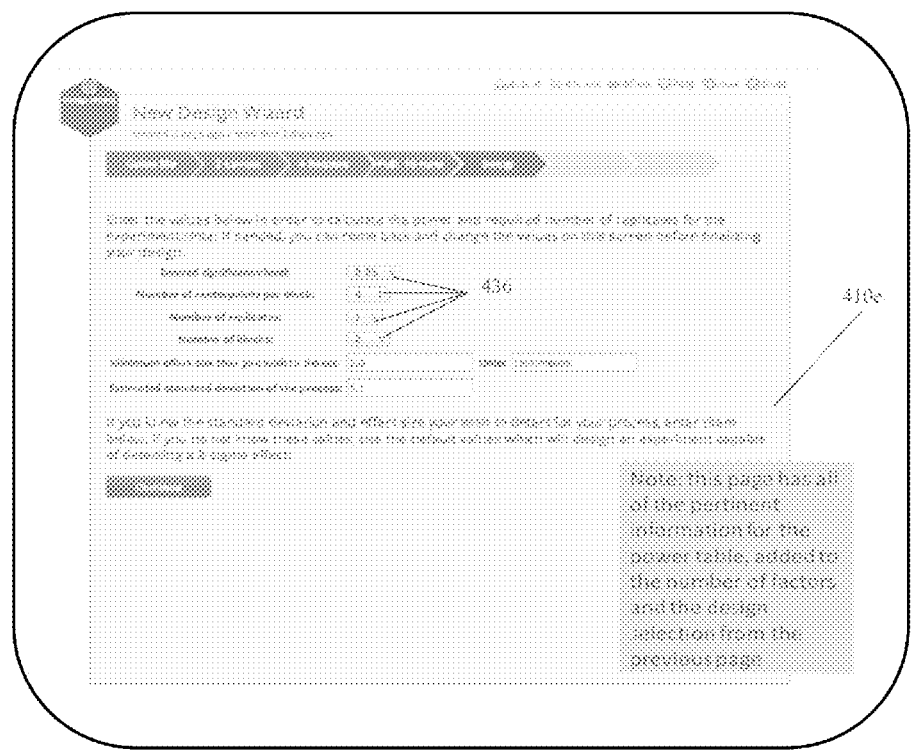
Figure 4F:
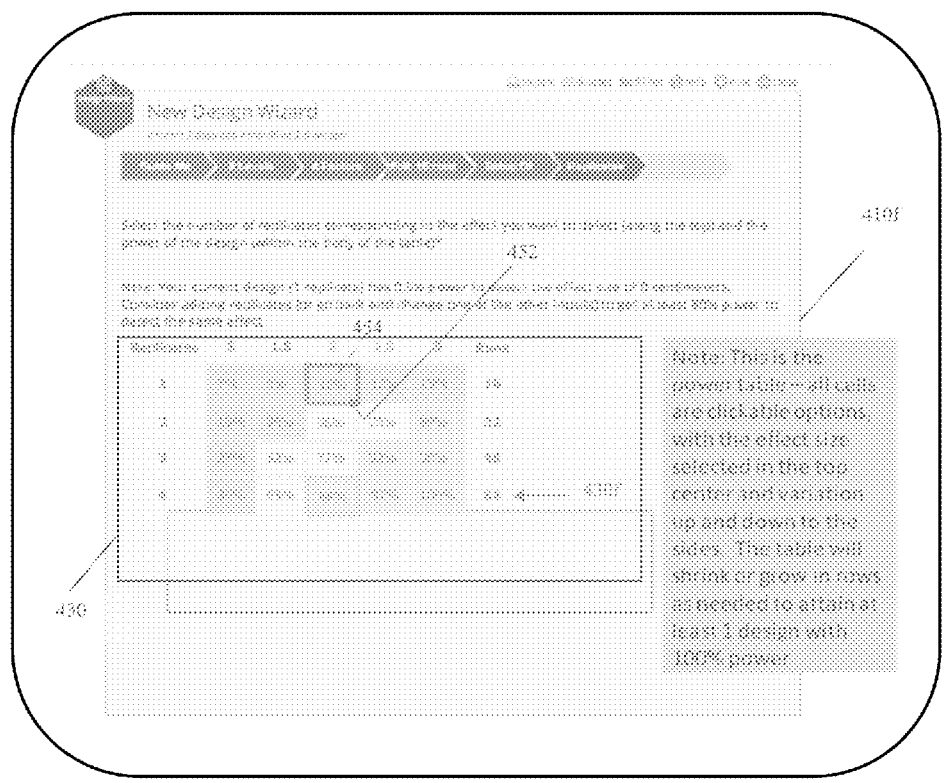
Figure 4G:
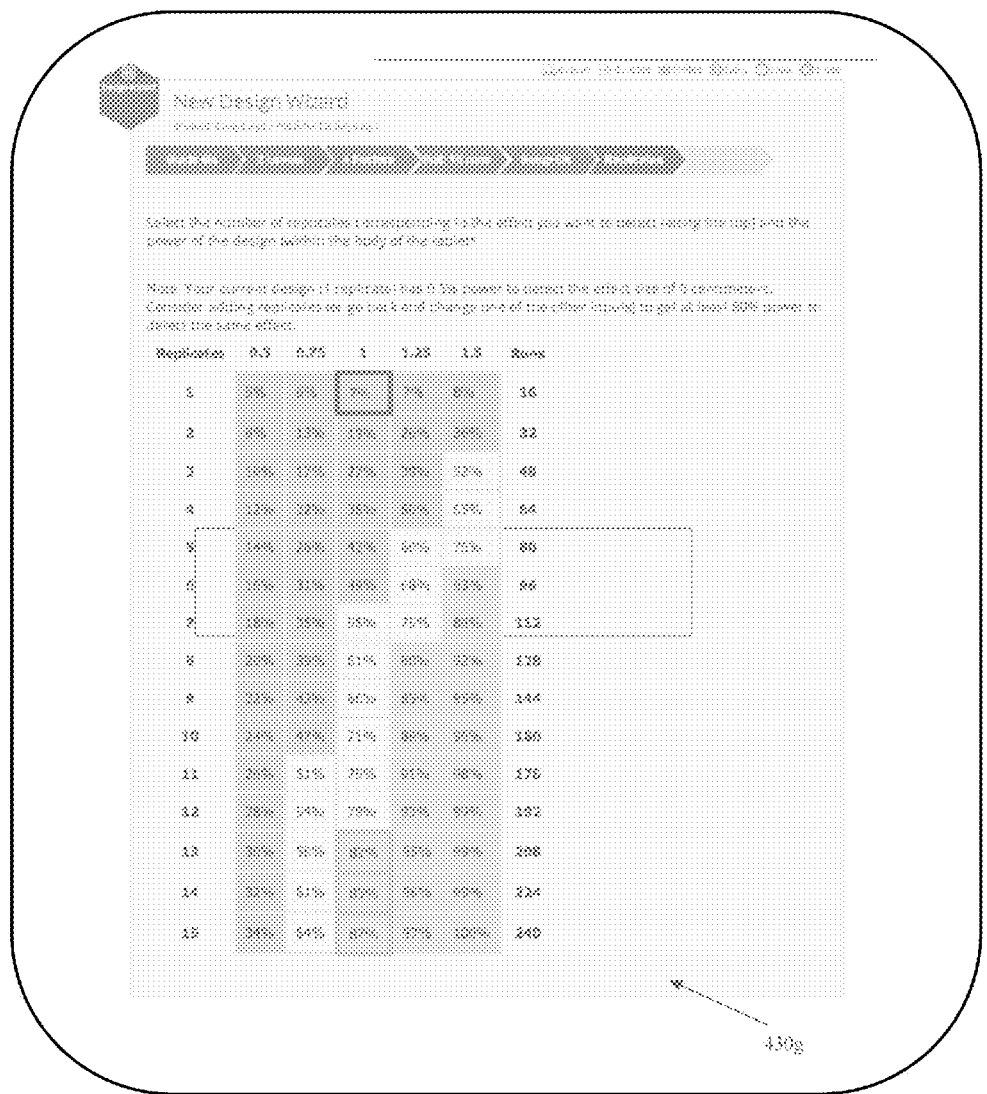
Figure 4H:
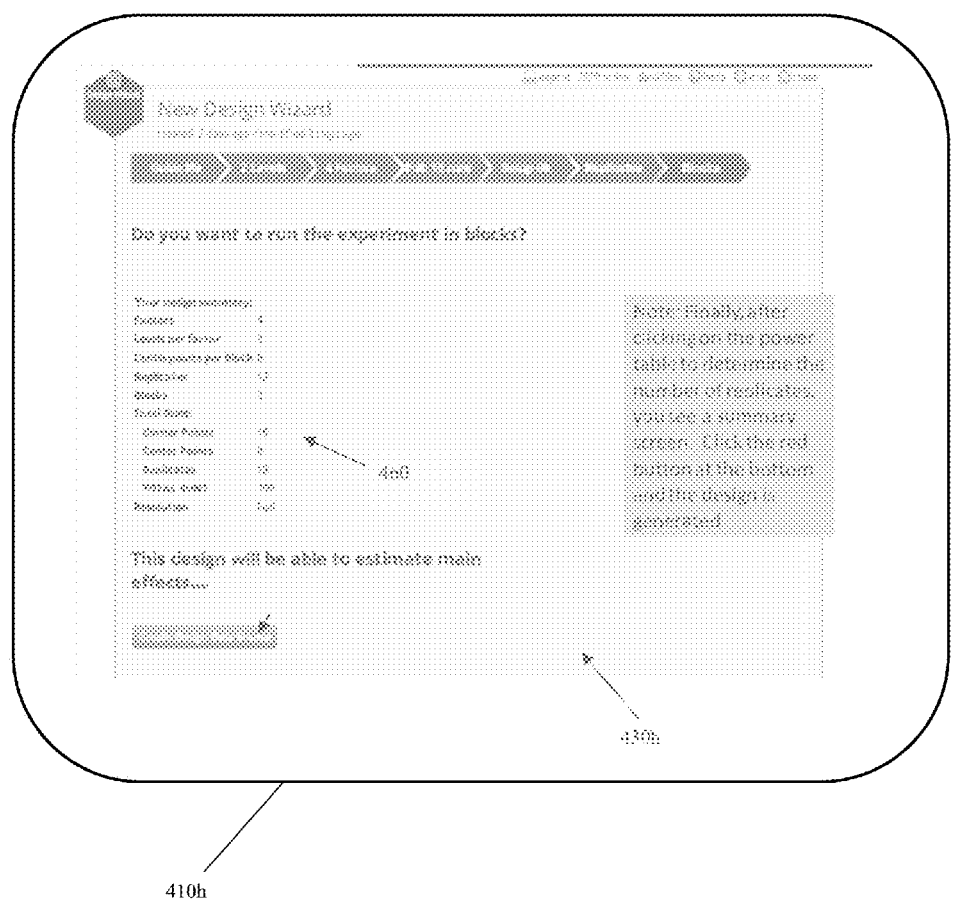
Figure 5:
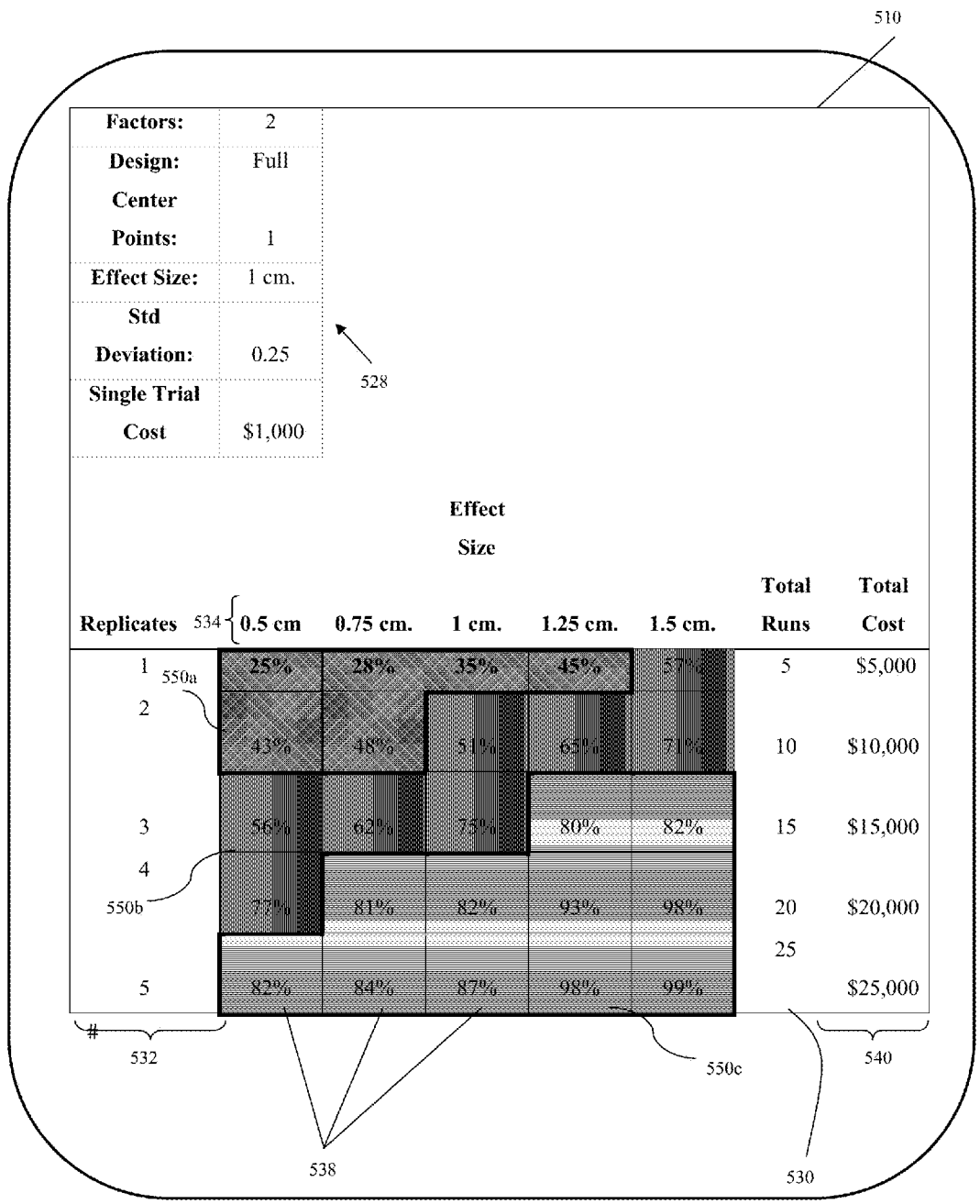
FIG. 5 is an illustration of a graphical user interface display embodying, at least partially, a product of a DOE process, according to the present disclosure.

FIGS. 3-6 illustrate exemplary methods and graphical user interfaces in accordance with the present disclosure. FIGS. 3A and 3B are basic flow charts of a DOE process incorporating improvements to the conventional processes. The process of FIG. 3A is described from the perspective of a user of one or more of the computing systems or proxies, and/or graphical user interface which may be generated through use of the computing system 100. The process of FIG. 3A is described from the perspective of the computing system 100. The DOE process introduced in this disclosure provides means for helping the user accurately predict (and select) the number of trials (runs) required in the experiment so as to detect a specified change (effect) in the output Y (the Power). FIGS. 4-6 illustrate exemplary graphical user interfaces that are well suited for carrying out or being utilized in various steps or stages of the improved process. Referring to FIG. 4A, the computer 100 generates and displays a graphical user interface 410a on the monitor 135. The exemplary graphical user interface 410a is an initiation page of a DOE wizard for creating designed experiments, according to the disclosure. FIGS. 4B-4H depict subsequent interactive graphical user interfaces that are presented to the user of the DOE and serve to guide the user in designing and selecting experiments that yield desired results.

Referring again to FIG. 3, the DOE process introduced herein preferably entails the initial steps of identifying the process to be studied and verifying the stability of that process. The measure of variation, expressed as the standard deviation of the process, is an important input to the DOE process. It is the best predictor of the variation that will be experienced during the actual experimental trials. A good illustration is a process designed to measure the length of a room. If the current process has a standard deviation of one centimeter, then it is statistically likely (to 95% confidence) that a room which measures 500 centimeters might return a measurement from the process of (approximately) between 497.5 and 502.5 centimeters. As such, the process would not be able to statistically differentiate between a room which actually measures 500 centimeters and another room which measure 501 centimeters (as the second room has a confidence interval of between 498.5 and 503.5 centimeters, thus the 501 centimeter room could be measured at 500 while the 500 centimeter room could return a measurement of 501). So, the current process cannot differentiate between the rooms based on a single sample. However, with multiple repeated samples, the standard deviation would decrease and the power of the measurements would increase, allowing the process to accurately detect the differences in the room.

The same logic of increasing the number of samples applies to the design of experiment process. A single sample of each of the experimental settings may not be able to detect the one centimeter difference in the rooms. This is referred to as the effect being measured. The noise of the process, expressed as the standard deviation of the process may be simply too large and therefore overwhelm the effect. This is often referred to as a signal (effect) to noise ratio.

A requirement of an effective DOE design is that the underlying process is stable. If the process is not stable, then any result observed in an experimental trial cannot be relied upon to have been a result of the change in the X input. If the process is stable, then a change in the output Y can be inferred to be a result of a change in the Y inputs. To detect that effect, the signal to noise ratio must, however, be such that the effect sought rises above the common noise of the process. This can only be achieved through the proper selection of the number of samples (trials) to collect.

In one aspect of a DOE system and process disclosed herein, the prospective experimenter is presented with an array of design options and in particular, estimates of the power of the designs to measure the effect required. The design options and the predicted power value are based on input data provided by the experimenter: the existing standard deviation of the process; the effect size desired; and the number of trials in the design.

As discussed previously, the power of a design may be defined as "the ability of a design to detect an effect, given that the effect actually exists". Ideally, a design of experiment is achieved with acceptably low Type I and Type II error rates (as those terms are generally defined in the art), and high statistical power. In practice, this is done by modeling the four components of statistical power—sample variance, sample size, the level of statistical significance, and the effect size of interest—in a process called statistical power analysis. Computing power for any specific study is an iterative, complex task. However, if the study is not sized appropriately by evaluating the influence of the size of the effect that it is important to detect and the inherent variability of the response process, during the planning stage, this omission can lead to one of two inefficiencies: (1) Low power (too little data; meaningful effect sizes are difficult to detect); and (2) High power (too much data; trivially small effect sizes can be detected). Here too many subjects are used, so that a trivially small difference in the effect is detectable. This design is inefficient, in that more subjects than necessary have to be studied to detect a meaningful effect, causing cost, and sometimes, ethical issues.

A study with low power will have indecisive results, even if the phenomenon being investigated is real. The effect may well be there, but without adequate power, it will not be found. On the other hand, a study with high power will likely find very significant results, even if the size of the effect detected is not practical in any meaningful way. Commercially available software packages suitable for use with the present systems and methods, and particularly, for computing power/sample size for experimental designs include: SAS, JMP, Minitab, SPSS, PASS, and G*Power. Additional references which may be of use to the prospective experimenter and designer of software applications include, "Design Sensitivity: Statistical Power for Applied Experimental Research" by Lipsey, Mark W. and Hurley, Sean M.; SAGE Handbook of Applied Social Research Methods (2nd edition, 2009), Ch. 2, pp. 44-76), and "Sample Size Determination" by Dell R. B., Holleran S., and Ramakrishnan R., ILAR J (2002),43(4):207-13.

Certain of the user interfaces in FIGS. 4A-4H are presented to the user-experimenter so as to elicit and facilitate receipt of this data and other related information. In a further aspect of the present system and process, a graphical user interface is generated presenting the prospective experimenter the various design options based on input data and criteria (elicited and received through prior user interfaces), including the predicted power values associated with, or corresponding to, each experiment option. In further preferred embodiments, the graphical user interface displays a table or matrix that presents the various experiment options according to the number of replicates and effect size, and the predicted power value for each such option. A used herein, a matrix is a table that is a rectangular array, and table may comprise one or more linear array of data or information.

In the conventional DOE design process, the experimenter identifies the process, verifies stability, identifies the factors to be used in the experiment, and is then left to 'guess' at the number of trials to run. The number of factors (input X) involved in the experiment determines the basic design of the experiment. If the design has two input factors, each being set at a high and low value, then a "full" set of experimental trials would consist of four runs ($2^2$=4 trials). With three input factors, the number of trials would rise to eight trials ($2^3$=8). Clearly, the number of trials will increase exponentially with the addition of more input factors to the experiment.

In a method of designing an experiment according to the present disclosure, the prospective experimenter selects the base number of trials (310). The experimenter determines whether or not to run a "full" or "fractional" experiment. In a full experiment, the number of runs is determined simply by the calculation of $2^N$ where N is the number of factors. Because each trial of an experiment can be very costly in terms of time, resources, and money, there may be a tendency for the experimenter to choose a fractional design with fewer trials. Without careful consideration, this choice can lead to a design incapable of distinguishing between effects that are caused by a single input factor and effects caused by an interaction of factors. This aspect of DOE design and the ramifications for the experiment are well understood in the art. Furthermore, the choice of a fractional design over a full design reduces the number of trials, thereby reducing the number of samples being taken. Recall that the power of the design to detect the desire effect (signal) is a direct function of the number of samples (trials being collected). As such, a preferred input step to the DOE process is selecting between a full design and a fractional design. This determines the base number of trials contained in the experiment.

Another decision made by the experimenter is whether to include center points in the design (312). Traditional DOE design assumes that the relationship between any input factor X and the output Y is linear between the low and high settings of X. The experimenter may wish to verify that this assumption of linearity is indeed correct by adding an additional trial to the experiment. This is accomplished by setting each input factor to its center or middle value, halfway between the low and high settings. For example, if input X has a range of 10 to 20 and input Y has a range of 50 to 100, the center point trial will be performed with X set to 15 and Y set to 75. The trials in a full experiment of this design, including a center point trial, are illustrated in Table 1 below.

TABLE 1

Trials in Full Experiment

| Trial | Factor X | Factor Y | Description |
|---|---|---|---|
| 1 | 10 | 50 | low-low |
| 2 | 10 | 100 | low-high |
| 3 | 20 | 50 | high-low |
| 4 | 20 | 100 | high-high |
| 5 | 15 | 75 | center point |

Generally, the present system and method is preferably not as concerned with the detection of linearity by the center point trial(s). However, the presence of additional trials (samples) due to the center point trial(s) does have a direct impact on reducing the measured variation of the experiment (the noise), thus making the ability to detect the signal (the effect) more likely.

Further in the design process, the experimenter selects the number of replicates of the experiment to run (314). A replicate is a complete re-running of the entire experiment. This can often be an expensive proposition, so there is a natural response to avoid replicates if at all possible. This may, however, result in an experimental design that cannot detect the signal (effect) desired given the variation (noise) of the process. The example experiment introduced above, with two replicates selected, now includes the runs shown in the following table.

TABLE 2

Design of Experiment for Process of Interest, with Multiple Replicates

| Replicate | Trial | Factor X | Factor Y | Description |
|---|---|---|---|---|
| 1 | 1 | 10 | 50 | low-low |
| 1 | 2 | 10 | 100 | low-high |
| 1 | 3 | 20 | 50 | high-low |
| 1 | 4 | 20 | 100 | high-high |
| 1 | 5 | 15 | 75 | center point |
| 2 | 1 | 10 | 50 | low-low |
| 2 | 2 | 10 | 100 | low-high |
| 2 | 3 | 20 | 50 | high-low |
| 2 | 4 | 20 | 100 | high-high |
| 2 | 5 | 15 | 75 | center point |
| 3 | 1 | 10 | 50 | low-low |
| 3 | 2 | 10 | 100 | low-high |
| 3 | 3 | 20 | 50 | high-low |
| 3 | 4 | 20 | 100 | high-high |
| 3 | 5 | 15 | 75 | center point |

Notably, the number of trials is increased from 5 to 15, dramatically increasing the power of the design and the ability to detect smaller effects in the output Y. Also, note that while the trials presented in Table 2 are ordered arranged in standard order, actual experiments will preferably randomize the order of the trials within each replicate.

Experiments that initially use only a single replicate, and are subsequently found to be deficient in their power to detect the desired effect, can at times be salvaged by the addition of replicates spaced later in time, after the initial analysis has been performed. The risk associated with late-addition of replicates is the potential effect of drift on the design. All process outputs tend to drift over time. By waiting a period of time between replicates, there is a greater chance of process output drift, which has the effect of adding a new factor to the experiment, as illustrated in the following table.

TABLE 3

Drift Effect of Adding New Factor

| Replicate | Trial | Factor X | Factor Y | Factor "Drift" | Description |
|---|---|---|---|---|---|
| 1 | 1 | 10 | 50 | 1 | low-low |
| 1 | 2 | 10 | 100 | 1 | low-high |
| 1 | 3 | 20 | 50 | 1 | high-low |
| 1 | 4 | 20 | 100 | 1 | high-high |
| 1 | 5 | 15 | 75 | 1 | center point |
| 2 | 1 | 10 | 50 | 2 | low-low |
| 2 | 2 | 10 | 100 | 2 | low-high |
| 2 | 3 | 20 | 50 | 2 | high-low |
| 2 | 4 | 20 | 100 | 2 | high-high |
| 2 | 5 | 15 | 75 | 2 | center point |
| 3 | 1 | 10 | 50 | 3 | low-low |
| 3 | 2 | 10 | 100 | 3 | low-high |
| 3 | 3 | 20 | 50 | 3 | high-low |
| 3 | 4 | 20 | 100 | 3 | high-high |
| 3 | 5 | 15 | 75 | 3 | center point |

What started as a full design with $2^2=4$ runs+1 center point for a 2 factor experiment, degraded into a $2^3=8$ runs/2=4 runs+1 center point design, which is referred to as a ½ fractional design where the experimenter will have the effects of the factor "drift" confounded with other interaction effects in the design. Additional trials have been added, raising the power of the design. The result is a more powerful design but one which has the fundamental problem being unable to distinguish between the input factors and their interactions with each other.

This failure mode is not guaranteed to happen with the late addition of replicates, but it is a potential risk that often goes undetected. In another aspect, the system and method of the present disclosure helps the experimenter make an intelligent determination of the number of center points and replicates at the beginning of the design process, before trials are started. Doing so ensures that the power of the design will be sufficient to achieve the goals of the experiment and also detect the desired size effect in the output Y.

With conventional DOE processes, the experimenter is not presented, at this stage, with sufficient information about the power of the experimental design. The system and process introduced herein utilizes the available sources of information to further facilitate the DOE selection task for the experimenter, and to predict the power of proposed experiments. The system and process utilizes the base number of trial selected, the number of center points selected, and a range of replicate options, to provide the experimenter further guidance. The prospective experimenter also selects and enters the desired effect size, for the prospective experiment to detect (316). Thereafter, the user may prompt the system or relevant software to generate for each combination of replicate number and desired minimum effect size, the predicted power of the experiment (318) (as discussed previously).

The experiment options, as defined by the number of replicates and effect size, and their corresponding power values may be presented in a variety of ways. Preferably, the system generates an interactive graphical user interface 510, containing a matrix or table 530, as shown in the FIG. 5 illustration. Referred to as a "Power Table" or grid, the matrix 530 presents to the prospective experimenter a range of the replicates count 532 on the vertical axis, and a range of effect size 534, centered on the desired effect size, on the horizontal axis. The product of these two ranges defines power cells 538 in the body of the matrix 530. The value in each cell 538 is the corresponding power of each interaction of replicates versus effect size, calculated based on user-input data relevant to the process of interest. A window 528 above the matrix 530 lists the input data, which includes the number of factors, base number of trials, number of center points, target effect size, standard deviation, and in this embodiment, cost of each trial or run.

Thus, the prospective experimenter with access to the power table 530 may move up or down a particular effect size 534, considering different values for the number of replicates along with the change in power (of a proposed experiment option) corresponding to the prompted combination of effect size and replicates count. Similarly, the prospective experimenter may move horizontally along a given replicates count row 532 and through varying effect sizes and observe the change in power value (of an experiment) with changes in the effect size. In this embodiment, the matrix 530 also provides an end column 540 presenting the cost for each experiment option. The cost increases, of course, as the number of runs increases (also presented), which is determined by the number of factors and replicates count. Accordingly, the prospective experimenter can balance the costs of additional replicates and trials with the ability to detect the desired effect with a sufficiently high degree of power. This allows the experimenter to compare visually and appreciate the tradeoffs between the number of replicates (and the corresponding number and cost of runs) versus the effect which can be detected and the power of the design.

As the experimenter changes the base design (full or fractional), or the number of center points in the design, the "power table" 530 is refreshed and updated to reflect the power of the various design options. Furthermore, using a control pointer, such as a mouse, cursor, and the like, the experimenter simply 'clicks' on the desired power level cell 538 to view further details of the selected experiment option. The "cell" is described as being a user—or controller— engageable or responsible graphical object element.

Further in this embodiment, the power cells 538 vary in shading or color to indicate degree of power. This provides yet another visual guide for the user in considering a range of acceptable design choices. As an example, power cells 538 with greater power values may be coded with progressively lighter colors or shading and power cells 538 with lesser power values may be coded with progressively darker colors, as with the power table 530 of FIG. 5. Alternatively, the power table 530 may equip power cells meeting a certain target threshold with a color or shading above a predetermined brightness. Such presentation is put in place to readily draw the attention of the prospective experimenter to appropriate design selections and to highlight trends in the matrix. With repeated use and familiarity, it is expected that such a presentation will become more effective as a guide to the frequent experimenter. In the power table 530 of FIG. 5, cells with power values less than 50% (550*a*) are presented in a red or lavender color shade. Cells with power values between 50% and 75% (550*b*) are presented in a lighter shade of yellow or orange, while cell with power values above 75% (550*c*) are presented in light green.

Because of the above-described attributes, the graphical user interface 510 and matrix 530 are preferred embodiments. The present disclosure contemplates, however, effective use of alternate graphical user interfaces and visual and interactive presentation formats for experiment options and associated power values. Such format will display at least the array of replicate count, array of effect sizes, and array of corresponding power values for the given process of interest. FIG. 6 provides, as an example, a simplified table format 630 presenting for each combination of pre-determined replicate count and effect size, corresponding power values. Cells containing the replicate count are positioned in one column 632 and adjacent a second column 634 of cells containing effect size values. A third column 636 is positioned adjacent second column 634 and contains an array of cells 648 containing power values. Thus, each available combination of replicate count and effect size is horizontally aligned, for appropriate visual effect and comparison, with a corresponding power value. In further embodiments, columns providing total runs and cost information may also be presented, in alignment with the other experiment data or parameters. In further embodiments, the power cells 648 may also be color coded for greater effect and to aid user selection of experiment options.

In one aspect, the series of graphical user interface displays in FIGS. 4A-4H represent steps in an exemplary method of designing and\or presenting experiment options according to the present disclosure. FIG. 4A provides a welcome screen 410*a* presented to the prospective experimenter. Given a set of factors (input X) and output Y, a product of the process as implemented by the user is a "designed experiment" including the number of replicates, the number of runs, and the power value of the experiment.

FIG. 4B provides an input screen 410*b* that prompts the user to enter factor level information, and more particularly, whether each factor has two levels or at least one factor has more than two levels. The user may engage either a "2 Level" button 420 or a "3+Level" button 422 to enter the information. The wizard then presents an input screen 410*c* for entry of factor information for the process of interest. A plurality of window boxes 424 are provided in which the experimenter may indicate the relevant factors, their type (continuous or discrete), the units of measure, and the high and low levels. The subsequent user interface display 410*d* in this embodiment presents an interactive table 426 from which the user may select prospective base number of trials for various designs. As shown, the Table 426 only highlights the design choices available based on the number of factors. The user, in this case, has moved a pointer 428 to select full experiment ($4^4$=16 runs). The prospective designs are presented for given pairs of number of runs desired and the number of factors.

FIG. 4E provides yet another input screen 410*e* for eliciting several more design input values from the user. The values are entered in designated window boxes 436. As discussed previously, in the system and process according to the present disclosure, the prospective experimenter enters as DOE inputs, a replicate count, the number of center point trials, and the minimum effect size desired. In the user interface display 410*e* of FIG. 4E, the user may also enter the estimated standard deviation of the process and the significance level. If an estimate of the process standard deviation is not available, the system enters a default value.

The user interface display 410*f* in FIG. 4F provides as a product of the preceding steps, the Power Table 430. Power Table 430 has many of the same features of the power table previously discussed, including a color coding scheme and other user interactive features. More importantly, the power table 430 presents power values for the various combinations of replicates count and effect size. In the example illustrated, the Power Table 430 generated does not appear to meet the appropriate design criteria or threshold. Using a control pointer 452, the user has prompted or designated power cell 454 in highlight, which is defined by replicate count of 1 and effect size 2.0 for a total number of 16 runs (tall experiment). The power value in cell 454 is very low, however. The system reports the deficiency in the power value of the design selection and advises the user to change one of the to achieve a proper design selection.

The preferred power table 430g is very user-interactive, as all the matrix cells and column and row properties are clickable options. In this way, the Table 430g can shrink or grow (e.g., to attain at least one design with 100% power). Moving to the user interface 410g in FIG. 4G, the system has generated an alternate power table 430g (or modified power table 430) in response to the user's changes to the number of replicates and effect size. Navigating the power table 430g, the user determines that the target power of 80% for an effect size of 1% may be achieved at 13 replicates (as well as 14 and 15 replicates). The total number of runs in the proposed experiment is 208 runs. The designed experiment satisfies the user and is selected by navigating the pointer to the appropriate cell. The summary page 430h of FIG. 4H is then presented upon the user's selection to commence the run experiment stage. The summary page 430h includes a summary outline 460 of the selected experiment, including the input values. The design may be selected by clicking the button 470 on the bottom of the page.

The foregoing description of exemplary embodiments is not intended to limit or restrict the scope or applicability of described systems, methods, and user interfaces. For example, the description focused on a particular type of software application, but such descriptions were provided for illustration and to give context to the described elements, methods, and procedures. It will be apparent to one skilled in the relevant art that many of these elements, methods, and procedures will also be applicable when integrated with or used in another environment. Specifically, many of the user interface features and techniques described in respect to FIGS. 3-6 may be used in conjunction with many other types of software applications, analytical methods, or computing environments.

Various features and advantages of the invention are set forth in the following claims.

What is claimed is:

1. A computer-implemented method of generating a plurality of selectable design experiments in the conduct of a design of experiments (DOE) process for analyzing a data set from a process to determine an effects relationship between a plurality of process factors and a process output, said method comprising:
   receiving as user input into a computing apparatus, a base number of trials and a number of center point trials; and
   generating a graphical user interface on a display connected with the computing apparatus, including presenting, at once, on the graphical user interface, a plurality of mutually exclusive designed experiments each defined, at least partially, by a combination of number of replicates count and effect size, and a predicted power value identified to each combination of replicates count and effect size, wherein each predicted power value is a value in a range from 0% to 100%, wherein generation of the graphical user interface is responsive to the user input of the base number of trials and the number of center point trials, and wherein presenting the designed experiments includes presenting the number of replicates count and effect size, and the predicted power value for each designed experiment; and
   generating a table identifying a power value for each combination of replicates count and effect size and wherein the table contains a plurality of cells, each containing a power value, each cell being associated uniquely with one of said combinations of replicates count and effect size, wherein presenting the plurality of designed experiment includes presenting the table.

2. The method of claim 1, further comprising:
   generating a graphical user interface display to elicit said user input of the base number of trials and the number of center point trials from a user and wherein the power values are contained in cells forming a matrix, and wherein each cell is engageable by a user to select a designed experiment option identified to the combination of replicates count and effect size associated with said engaged cell.

3. The method of claim 1, wherein the computing apparatus includes a non-transitory computer-accessible storage medium having program instructions stored thereon, wherein the program instructions are computer-executable to implement generate and present the graphical user interface and the table for presentation on the display.

4. The method of claim 1, further comprising:
   upon selection of a designed experiment option by a user selecting a cell that identifies a power value, generating a subsequent graphical user interface presenting information on the selected designed experiment option.

5. The method of claim 4, wherein cells containing power values above a threshold value are displayed with a first color and cells displayed with a second color contain power values less than the threshold value.

6. The method of claim 1, wherein presenting designed experiments includes displaying a cost of trials value for each said combination of replicates count and effect size.

7. The method of claim 1, further comprising:
   prior to presenting designed experiment options, generating a graphical user interface to receive factor information including a factor designation, and high level and low level values for each factor designation.

8. The method of claim 7, further comprising:
   prior to presenting designed experiments, generating a graphical user interface to receive, as user input, a base number of trials.

9. The method of claim 8, wherein generating a user interface to receive a base number of trials, includes eliciting user election of either a full experiment or a fractional experiment.

10. The method of claim 8, further comprising:
    prior to presenting designed experiments, generating a graphical user interface to receive, as input to a determination of power values, a numerical value for number of center points, high level values and low level values for each of a plurality of selected factors.

11. The method of claim 10, further comprising:
    prior to presenting designed experiments, generating a graphical user interface to receive, as input to a determination of power values, a numerical value for target minimum effect size.

12. The method of claim 10, further comprising:
    prior to presenting designed experiments, generating a graphical user interface to receive, as input to a determination of power values, a numerical value for a standard deviation of the process.

13. The method of claim 8, further comprising:
    prior to presenting designed experiments, generating one or more user interfaces to receive, as input to a determination of power values, a numerical value for a number of center points, a numerical value for target minimum effect size, and base number of trials.

14. The method of claim 1, wherein presenting designed experiments includes generating a matrix defined by replicates count and effect size, whereby the matrix contains, as elements, predicted power values for each combination of replicates count and effect size.

15. The method of claim 14, wherein presenting designed experiments includes generating a cost of trials column aligned with a column of the replicates count.

16. A non-transitory graphical user interface generated by a computing apparatus, said graphical user interface comprising:
a section presenting experiment options including a first array of numerical values of replicates count in a designed experiment option and a second array of numerical values of effect size in a designed experiment option, wherein the first array and second array are positioned in alignment such that each of the replicates counts in the first array uniquely align with one of the effect size values in the second array, and wherein a designed experiment power value is determined and presented in unique association with a combination of one of said replicates count and the effect sizes aligned therewith; and
wherein the first array, the second array, and the power values are presented in a matrix table having a dimension equal to the number of replicate values by the number of effect size values, and containing, as elements, power values for each said combination of replicates count and effect size and wherein the power values are contained in cells forming the matrix, and wherein each cell is engageable by a user to select a designed experiment option identified to the combination of replicates count and effect size associated with said engaged cell and generate a user interface associated with the engaged cell.

17. A non-transitory computer-accessible storage medium storing program instructions computer-executable to implement one or more graphical user interfaces for presentation of design of experiments options on a computer display, wherein the experiments are for analyzing a data set from a process to determine an effects relationship between a plurality of process factors and a process output, wherein:
generation of a graphical user interface presenting designed experiment options is responsive to user select input of base number of trials, effect size, and number of center point trials; and
the graphical user interface presenting designed experiment options includes a first array of numerical values of replicates count in a designed experiment option and a second array of numerical values of effect size in a designed experiment option; and
wherein the first array and second array are positioned in alignment such that each of the replicates counts in the first array uniquely align with one of the effect size values in the second array, and wherein a designed experiment power value is determined and presented in unique association with a combination of one of said replicates count and the effect sizes aligned therewith.

18. The computer-accessible medium of claim 17, wherein the graphical user interface presenting designed experiment options further includes an array of cost of trial values, each of the cost values being associated with one of said combinations of replicates count and effect size.

19. The computer-accessible medium of claim 17, wherein the power values are color coded by strength of power value.

20. The computer-accessible medium of claim 17, wherein the first array, the second array, and the power values are presented in a matrix table having a dimension equal to the number of replicate values by the number of effect size values, and containing, as elements, power values for each said combination of replicates count and effect size.

21. The computer-accessible medium of claim 17, wherein one or more user interfaces preceding the user interface presenting designed experiment options includes a first user interface configured to receive, as user input, base number of trials information, a second user interface configured to receive, as user input, factor and level information, and a third user interface configured to receive, as input, target effect size range; and
wherein said power values are calculated based, at least partly, on values for base number of trial and target size effect as inputted on said first, second, and third user interfaces.

22. A computer-implemented method of conducting a design of experiments (DOE) for analyzing a data set from a process to determine an effects relationship between a plurality of process factors and a process output, said method comprising:
entering into a computing apparatus, a base number of trials, a number of center point trials, and a target effect size;
prompting the computing apparatus to generate on a display connected with the computing apparatus, a graphical user interface, including presenting a display containing a plurality of user-responsive cells each presenting a designed experiment option defined, at least partially, by a combination of replicates count and effect size, the user interface further presenting a predicted power value for each combination of replicates count and effect size;
wherein presenting the plurality of designed experiments further includes generating a table identifying a power value for each combination of replicates count and effect size;
wherein the table contains a plurality of cells, each containing a power value, each cell being associated uniquely with one of said combinations of replicates count and effect size; and
wherein, upon selection of a designed experiment option by a user selecting a cell that contains a power value, generating a subsequent graphical user interface presenting information on the selected designed experiment option.

23. The method of claim 22, wherein presenting designed experiment options further comprises generating a table displaying the power values, wherein each power value is identified uniquely by a combination of replicates count and effect size.

24. The method of claim 23, wherein the table contains a plurality of cells, each cell containing a power value from 0% to 100% identified to one of said combination of replicates count and effect size.

25. The method of claim 24, further comprising:
selecting an experiment option by selecting a cell containing a power value, thereby causing display of a subsequent graphical user interface presenting information on the selected designed experiment option.

26. The method of claim 25, wherein cells with power values above a threshold value are displayed with a first color and cells displayed with a second color contain power values less than the threshold value.

27. The method of claim 24, wherein presenting designed experiment options includes generating a matrix defined by replicates count and effect size, whereby the matrix contains, as elements, predicted power values for each combination of replicates count and effect size.

28. The method of claim 27, further comprising modifying presentation of the matrix on the graphical user interface by engaging a vertical axis defined by replicates count and causing the vertical axis to extend, thereby adding a plurality of rows to the matrix and increasing a total number of replicates counts and thereby increasing the number of power values as elements of the matrix, and increasing the number of designed experiment options presented.

29. The method of claim 22, further comprising generating a modified table in response to changes to the number of replicates and effect size.

30. The method of claim 22, further comprising generating a modified table in response to changes to the number of replicates and effect size to attain at least one design experiment having a predicted power value of 100%.

31. The method of claim 30, wherein said generating step is repeated multiple times until a table having a cell with a predicted power value of 100% is generated.

\* \* \* \* \*